Figure 1:
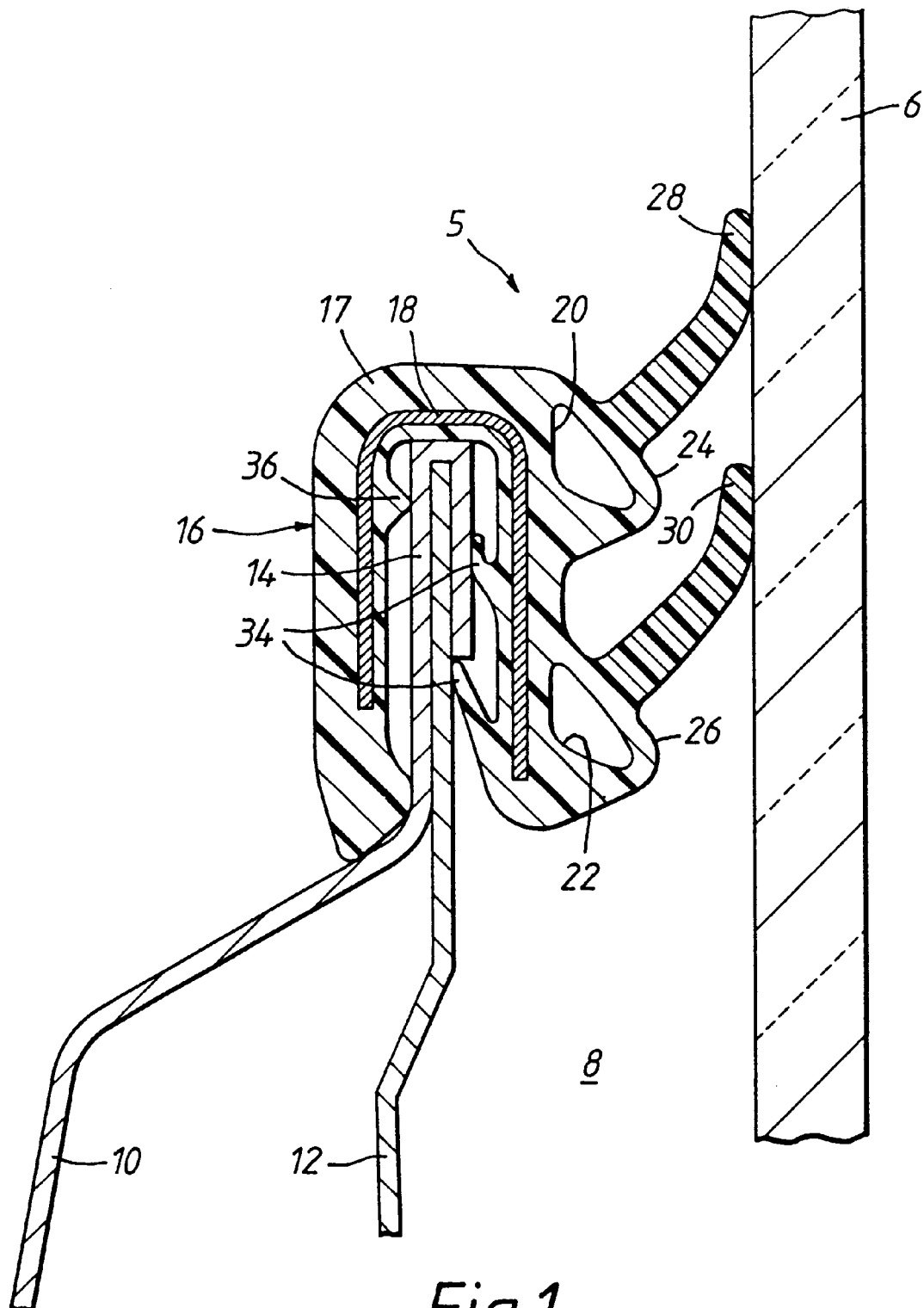

United States Patent [19]
Oord

[11] Patent Number: 5,970,659
[45] Date of Patent: Oct. 26, 1999

[54] SEALING AND GUIDING STRIPS

[75] Inventor: Henricus Van Den Oord, 'S-Hertogenbosch, Netherlands

[73] Assignee: Draftex Industries Limited, Edingburgh, United Kingdom

[21] Appl. No.: 09/011,736

[22] PCT Filed: Aug. 15, 1996

[86] PCT No.: PCT/GB96/01990

§ 371 Date: May 15, 1998

§ 102(e) Date: May 15, 1998

[87] PCT Pub. No.: WO97/08004

PCT Pub. Date: Mar. 6, 1997

[30] Foreign Application Priority Data

| Aug. 25, 1995 | [GB] | United Kingdom | 9517437.1 |
| Dec. 15, 1995 | [GB] | United Kingdom | 9525686.3 |
| Mar. 15, 1996 | [GB] | United Kingdom | 9605503.3 |

[51] Int. Cl.⁶ .................................................. B60J 1/16
[52] U.S. Cl. ................................ 49/377; 49/496.1
[58] Field of Search ....................... 49/377, 440, 441, 49/496.1, 490.1, 495.1, 498.1

[56] References Cited

U.S. PATENT DOCUMENTS

| 4,442,634 | 4/1984 | Kimura | 49/493 |
| 4,952,442 | 8/1990 | Warner | 49/490.1 |
| 5,085,005 | 2/1992 | Yasukawa et al. | 49/377 |
| 5,095,655 | 3/1992 | Warren | 49/374 |
| 5,181,341 | 1/1993 | Keys et al. | 49/490.1 |
| 5,207,029 | 5/1993 | Nozaki et al. | 49/495.1 |
| 5,463,831 | 11/1995 | Shinagawa et al. | 49/377 |
| 5,469,667 | 11/1995 | LeMarrec | 49/498.1 |
| 5,538,317 | 7/1996 | Brooke et al. | 49/490.1 |
| 5,586,772 | 12/1996 | Deaver | 49/498.1 |
| 5,622,008 | 4/1997 | King | 49/490.1 |
| 5,806,914 | 9/1998 | Okada | 49/498.1 |

FOREIGN PATENT DOCUMENTS

| 0 333 536 | 9/1989 | European Pat. Off. . |
| 0 443 345 | 8/1991 | European Pat. Off. . |
| 486163 | 5/1992 | European Pat. Off. . |
| 0 619 199 | 10/1994 | European Pat. Off. . |
| 0 644 350 | 3/1995 | European Pat. Off. . |
| 851521 | 10/1960 | United Kingdom . |
| 1357006 | 6/1974 | United Kingdom ............. 49/498.1 |
| 2 221 487 | 2/1990 | United Kingdom . |
| 2 239 282 | 6/1991 | United Kingdom . |
| 2 292 963 | 3/1996 | United Kingdom . |

Primary Examiner—Daniel P. Stodola
Assistant Examiner—Curtis A. Cohen
Attorney, Agent, or Firm—Leydig, Voit & Mayer, Ltd.

[57] ABSTRACT

A window frame, as for a motor vehicle, with a window pane slidably movable therein along a predetermined path and a sealing arrangement for sealing against the window pane as it moves along the predetermined path is disclosed which comprises mounting means for mounting the sealing arrangement on the frame, sealing means forming part of the sealing arrangement and comprising flexible material, a sealing lip made of harder material, whereby the flexible wall dampens vibrations of the lip.

13 Claims, 3 Drawing Sheets

SEALING AND GUIDING STRIPS

The invention relates to a sealing arrangement for sealing against a generally planar surface movable along a predetermined path, comprising mounting means for mounting the sealing arrangement adjacent the path to extend longitudinally in a direction generally transverse to the path, and sealing means resiliently supported on the mounting means and comprising flexible material defining a longitudinally extending hollow chamber having an outwardly facing flexible wall and a longitudinally extending sealing lip mounted on the flexible material defining the hollow chamber and projecting outwardly therefrom to a distal end of the lip for continuously and sealingly contacting the movable surface.

The invention also relates to a waist seal for sealing against a surface of a window pane which is mounted in the window opening of a motor vehicle and movable through a waist gap into and out of a lower part of a vehicle body part, the waist seal comprising a longitudinally extending channel-shaped gripping portion for mounting the waist seal adjacent to and extending along one edge of the gap, flexible material extending from the gripping portion to define a longitudinally extending hollow chamber having a flexible wall facing generally towards the gap, and at least one flexible longitudinally extending sealing lip carried by the flexible material and projecting away therefrom for making continuous sealing contact with one face of the window glass as it moves through the gap.

Such a sealing arrangement and waist seal are known from U.S. Pat. No. 5,095,655. In this known sealing arrangement and waist seal, a sealing lip is shown for making continuous contact with a slidable window glass in a motor vehicle window carried by the vehicle door. The lip is integrally supported on the outside of a hollow chamber made of flexible material which is in turn supported by a panel of the door. This sealing lip is an extension of a wall of the hollow chamber.

It is desirable in sealing arrangements and waist seals of this type for the sealing lip to be in reasonably firm sealing contact with the window glass, in order to ensure weather-tightness and good sealing against noise. However, a problem with such sealing arrangements is the creation of "squeaking" noises created by the sealing lips when the window glass is moved up or down. This noise is unwelcome, particularly in high quality vehicles. The invention aims to deal with this problem.

Therefore, the known sealing arrangement as first set forth above is characterised in accordance with the invention in that the lip is mounted on and supported by the outwardly facing flexible wall at a position intermediate the longitudinal edge boundaries of the wall whereby the flexible wall provides resilient damping means for damping vibrations of the lips.

In addition, the known waist seal as first set forth above is characterised in accordance with the invention in that the lip is mounted on the flexible wall at a position intermediate the longitudinal edge boundaries of the flexible wall such that vibrations of the lip are damped by the flexing of the flexible wall.

A sealing and wiping arrangement is also known from EP-A-0 486 163. In this known arrangement, flexible material defining a hollow chamber is mounted adjacent a window glass slidable in a window frame carried by a vehicle door. The hollow chamber has a flexible wall facing towards the window glass and a wiper blade integrally extends outwardly from the mid-point of this flexible wall towards the window glass. The flexible chamber can be expanded and collapsed (e.g. by changing the air pressure) so as to move the wiper blade into wiping contact with the surface of the window glass for cleaning purposes. The wiper blade flexes angularly in either direction according to the direction of the movement of the window glass. For this reason, and also because this wiper blade is not continuously in contact with the window glass, the problem of the squeaking noise created by a sealing lip does not arise.

Figure 2:
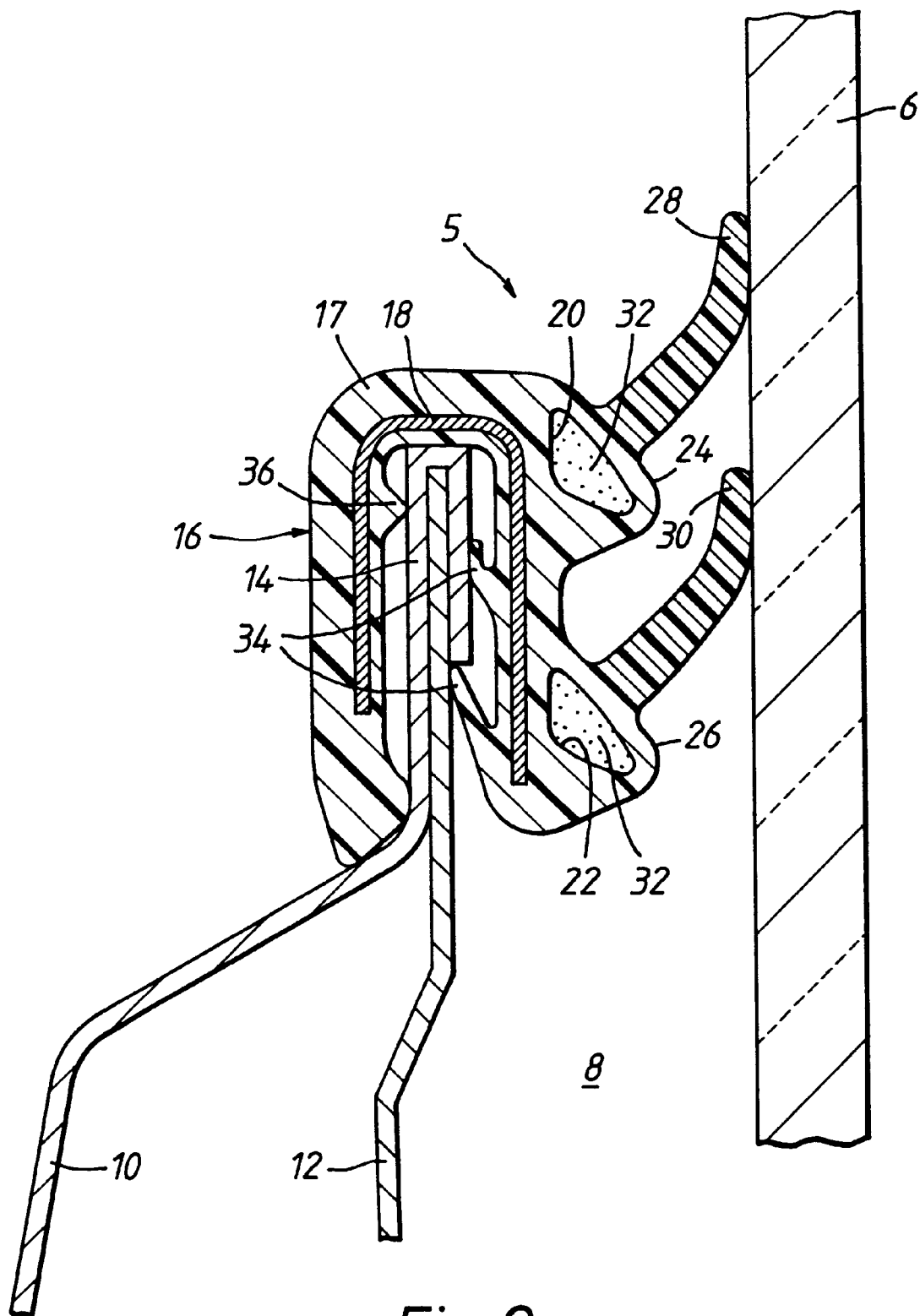

Sealing strips forming waist seals and embodying the invention will now be described, by way of example only, with reference to the accompanying diagrammatic drawings in which:

FIG. 1 is a transverse cross-sectional view through one of the waist seals;

FIG. 2 corresponds to FIG. 1 but shows a modification; and

Figure 3:
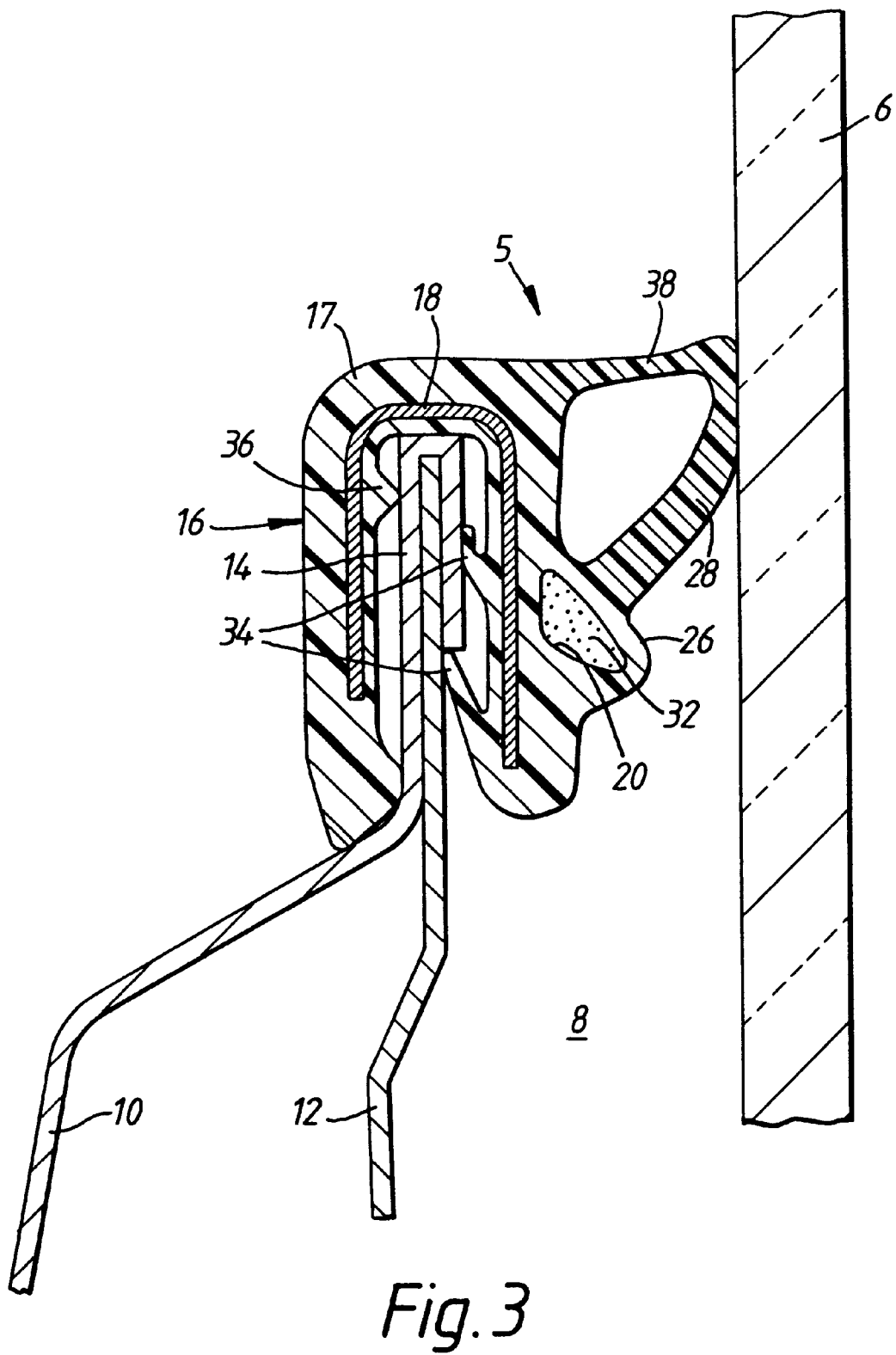

FIG. 3 shows another of the sealing strips.

The waist seal 5 is for mounting on a vehicle body adjacent to a slidable window glass 6. In a particular example, the waist seal 5 is mounted to run along the lower generally horizontal edge of the window frame mounted on a vehicle door, alongside the slot through which the window glass 6 can be raised from or lowered into the lower part 8 of the hollow vehicle door.

FIG. 1 shows the panels 10 and 12 of the vehicle door which are brought together along this edge, or waist, and are welded together at intervals to form a flange 14.

The waist seal 5 comprising a channel-shaped gripping section 16 formed from plastics or rubber material 17 extruded over a channel-shaped embedded metal carrier 18. The metal carrier 18 may take any suitable form. For example, it may be a simple longitudinally extending U-shaped metal carrier. Instead it may be made up of U-shaped metal elements arranged side-by-side in a longitudinal direction to define a channel. It will be appreciated that other forms of carrier are possible. The gripping section 16 may be produced by extrusion, the carrier 18 being incorporated by using a cross-head extruder.

The extruded plastics or rubber material 17 is extruded to provide two longitudinally extending hollow chambers 20 and 22 which run along the length of the seal. On the outer wall 24 and 26, on the outside of each of these hollow chambers 20,22, a respective lip 28,30, is supported. The outer walls 24,26 are relatively flexible. Preferably, the lips 28,30 are integrally extruded with the material 17. They may be made of relatively hard material, possibly harder than the material 17. The lips 28 and 30 may be co-extruded with the material 17. Instead, though, they could be made separately and secured as by adhesive.

The material 17 may be integrally extruded with gripping lips 34 and 36 running along the inside of the channel of the gripping portion. These gripping lips make contact with the sides of the flange 14 and provide a sealing and gripping effect. The lips may be extruded from material which is softer than the remainder of the extruded material of the gripping portion, thereby increasing their gripping effect. The lips may have various different shapes and there may be more or less than the number of lips shown.

In use, the lips 28,30 bear against one face of the window glass 6 and thus provide a seal against ingress of water or moisture and dirt into the lower part 8 of the door. The surfaces of the lips 28 and 30 which bear against the window glass 6 may be covered with flock or other lower-friction material. The resilience of the material of the lips 28,30 urges them into contact with the surface of the glass 6.

As the window glass is raised or lowered and slides against the surfaces of the lips 28,30, any tendency for an unwelcome noise or squeak to be produced by the contact between the lips and the window glass is removed or minimised by the damping effect of the damping means constituted by the flexible outer walls 24,26 and the hollow chambers 20,22. The damping means so constituted reduces any tendency for the lips 28,30 to vibrate and produce noise or squeaking, and, in addition, damps the transmission of any such noise or squeaking. It is believed that the vibrations of the lips 28,30 tend to produce reciprocations of the lips in directions substantially perpendicular to the walls 24,26 and that the walls 24,26 resist and damp these reciprocations.

It will be appreciated that the waist seal 5 may be modified so that there is only one lip 28,30 instead of two and, consequently, only one chamber 20,22.

A similar waist seal may be provided on the opposite side of the window glass. Instead, a conventional waist seal may be provided there.

In the modification shown in FIG. 2, the damping means is modified by filling or partially filling the chambers 20,22 with a polyisobutylene material 32, or a similar material having like damping characteristics. This material helps the damping effect of the damping means, by providing additional attenuation of the above-mentioned reciprocations of the lips 28,30.

In the sealing strip of FIG. 3, in which parts corresponding to those in the other Figures are correspondingly referenced, only a single lip 28 is used. However, this lip is supported by a flexible web 38.

In the arrangement of FIG. 3, the chamber 22 is filled with a damping material 32 of the type described with reference to FIG. 2. Instead, however, the chamber 20 could be empty.

I claim:

1. In combination, a window frame with a window pane slidably movable therein along a predetermined path and a sealing arrangement for sealing against the window pane as it moves along the predetermined path, comprising mounting means mounting the sealing arrangement on the frame and adjacent the path to extend longitudinally in a direction generally transverse to the path, sealing means forming part of the sealing arrangement and resiliently supported on the mounting means and comprising flexible material defining a longitudinally extending hollow chamber having a flexible wall facing towards the predetermined path and having two parallel spaced apart longitudinal edge boundaries, and a longitudinally extending sealing lip forming part of the sealing arrangement and made of harder material than the flexible wall and mounted on and supported by the flexible wall at a position intermediate said longitudinal edge boundaries and projecting outwardly therefrom to a distal end of the lip which continuously and sealingly contacts the movable window pane, whereby the flexible wall provides resilient damping means for damping vibrations of the lip.

2. The combination according to claim 1, in which the hollow chamber is substantially empty except for air or other gas.

3. The combination according to claim 1, in which the chamber is at least partially filled with damping material.

4. The combination according to claim 3, in which the damping material is a polyisobutylene material.

5. The combination according to claim 1, including a flexible web extending between the mounting means and a part of the lip at or adjacent its distal end.

6. The combination according to claim 1, in which the mounting means incorporates extruded plastics or rubber material and the sealing means is also made of extruded rubber or plastics material.

7. The combination according to claim 1, in which the mounting means is channel-shaped and resiliently grips the window frame.

8. In combination, a waist seal and a window frame of a motor vehicle, the window frame having a window pane slidably movable therein through a waist gap into and out of a lower part of a vehicle body part carrying the frame;

the waist seal comprising
     a longitudinally extending channel-shaped gripping portion mounting the waist seal adjacent to and extending along one edge of the gap for sealing against a surface of the window pane,
     flexible material extending from the gripping portion to define a longitudinally extending hollow chamber having a flexible wall which faces generally towards the gap and which has two parallel spaced apart longitudinal edge boundaries, and
     at least one flexible longitudinally extending sealing lip made of material which is harder than the flexible wall and is mounted on the flexible wall at a position intermediate the longitudinal edge boundaries to project away therefrom into continuous sealing contact with one face of the window pane such that vibrations of the lip are damped by the flexing of the flexible wall.

9. The combination according to claim 8, in which the hollow chamber incorporates damping material (32).

10. The combination according to claim 8, in which the gripping portion incorporates extruded channel-shaped plastics or rubber material which is co-extruded with the material of the lip.

11. The combination according to claim 8, including a channel-shaped metal carrier embedded within the gripping portion.

12. The combination according to claim 8, in which the lip has a surface carrying a layer of low-friction material such as flock which makes contact with the window pane.

13. The combination according to claim 8, including a flexible web extending from the gripping portion to a position on the lip adjacent its contact with the window pane.

* * * * *